United States Patent
Ujihara et al.

(10) Patent No.: US 6,359,886 B1
(45) Date of Patent: Mar. 19, 2002

(54) METHOD AND APPARATUS FOR FILTERING AND ROUTING COMMUNICATIONS FRAMES

(75) Inventors: Dean A. Ujihara, Los Altos Hills; Leonard R. Fishler, Cupertino; Richard Mayfield, Saratoga; Bahman Zargham, Sunnyvale, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/135,027

(22) Filed: Aug. 17, 1998

(51) Int. Cl.[7] .......................... H04L 12/28; H04L 12/56
(52) U.S. Cl. ...................... 370/392; 370/397; 370/399; 709/238
(58) Field of Search ................................ 370/256, 432, 370/392, 389, 397, 399; 709/221, 216, 238; 707/2

(56) References Cited

U.S. PATENT DOCUMENTS 5,917,821 A * 6/1999 Goguyan et al. ........... 370/392
6,041,053 A * 3/2000 Douceur et al. ............ 370/389
6,105,018 A * 8/2000 Demers et al. ............. 370/389

* cited by examiner

*Primary Examiner*—Hassan Kizou
*Assistant Examiner*—John Pezzlo
(74) *Attorney, Agent, or Firm*—Leah Sherry Oppenheimer Wolff & Donnelly (57) ABSTRACT

A method and apparatus for sorting and classifying communications frames received over a network prior to delivery, using a collection of filters arranged as a decision-making tree with destinations for the frames as the leaves of the tree.

4 Claims, 7 Drawing Sheets

Frame #_900

| BYTES | FIELD | LAYER |
|---|---|---|
| 0-5 | Destination Address | Ethernet |
| 6-11 | Source Address | |
| 12-13 | Type/Length | |
| 14 | Version and Length | IP |
| 15 | Prec. and TOS | |
| 16-17 | Total Length | |
| 18-19 | Identification | |
| 20-21 | O,D, M and Fragment Offset | |
| 22 | Time to Live | |
| 23 | Protocol | |
| 24-25 | Checksum | |
| 26-29 | Source Address | |
| 30-33 | Destination Address | |
| (NONE) | Options | |
| 34-35 | Source Port | TCP |
| 36-37 | Destination Port | |
| 38-41 | Sequence Number | |
| 42-45 | Acknowledgement Number | |
| 46 | TCP Header Length (*inter alia*) | |
| 47 | U, A, P, R, S and F (*inter alia*) | |
| 48-49 | Window Size | |
| 50-51 | TCP Checksum | |
| 52-53 | Urgent Pointer | |
|  | Options | |

*Figure 9*

METHOD AND APPARATUS FOR FILTERING AND ROUTING COMMUNICATIONS FRAMES

BACKGROUND OF THE INVENTION

This invention relates to communications over networks and internetworks. More particularly, this invention relates to the filtering and routing of communications frames on such networks.

Figure 1:
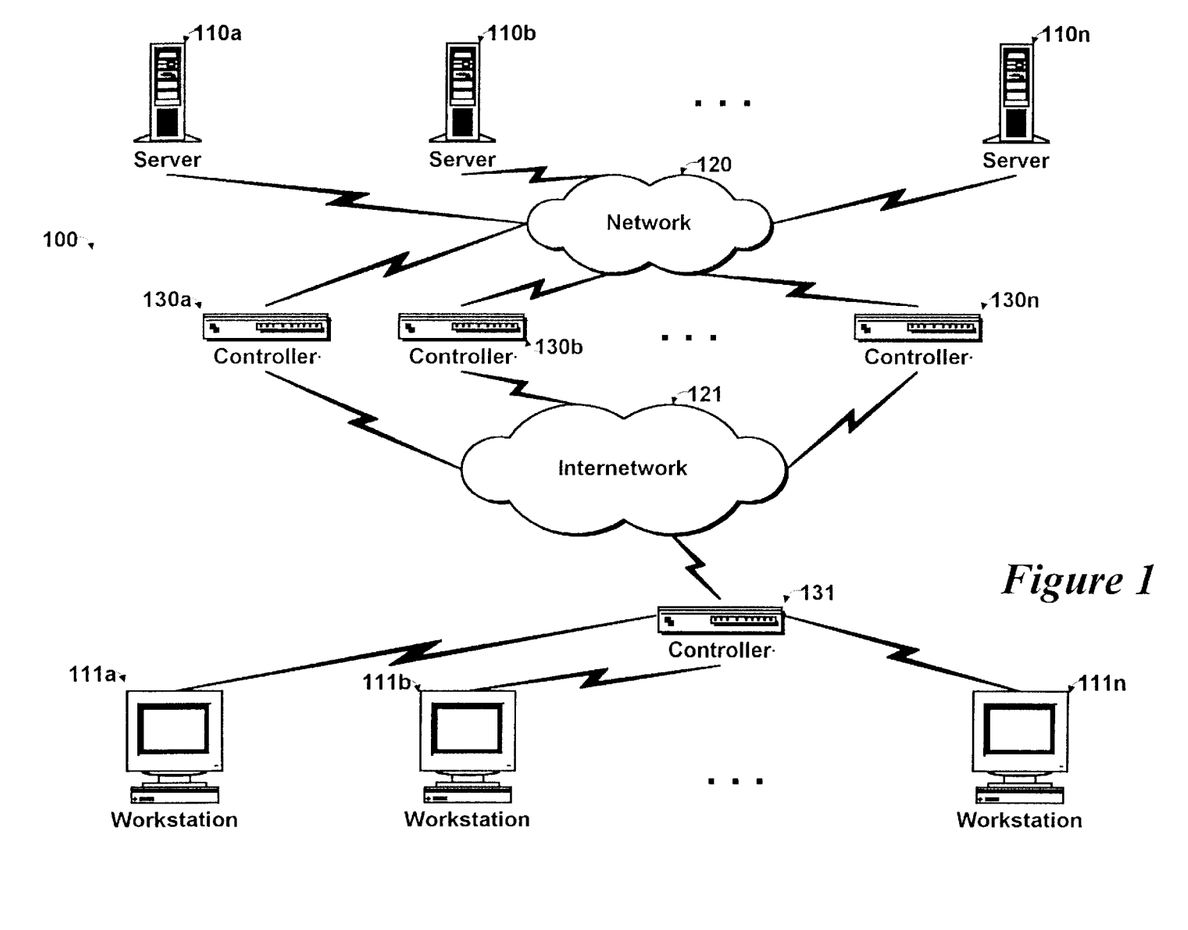
FIG. 1 is an illustration of a typical communications internetwork of the prior art.

FIG. 1 is an illustration of a typical communications internetwork 100 of the prior art. In FIG. 1, processors 110a, 110b, ..., 110n interconnect by means of network 120. I/O controllers 130a, 130b, ..., 130n also connect to network 120.

Within their respective processors 110, I/O processes are the initial consumers of the data transported over the network 120.

Processors 111a, 111b, ..., 111n and the network 120 connect to the internetwork 121 by means of the gateways 131 and 130, respectively.

In the multiprocessor systems available from the assignee of the instant invention, whose constituent processors 110 co-operate to distribute the workload among themselves, the I/O processes are ordered such that one such process is designated the primary I/O process. Each of the controllers 130 communicates frames from the network 120 directly to only (the processor 110 running) that primary I/O process. The primary I/O process has the responsibility to determine the actual destination processor 110 of a frame and to forward that frame from its processor 110 to the destination processor 110. Processor-to-processor copying effects the forwarding.

Funneling all frames to the processor 110 of the primary I/O process places a significant burden on that processor 110. Further, assuming that the actual destinations of the frames are evenly distributed among the processors 110 of the multiprocessor system, at least one-half of the frames forwarded to the processor 110 of the primary I/O process 110 must be subjected to an interprocessor copy, tying up the resources of both the primary I/O process processor 110 and the destination processor 110, as well as the network 120. As the number of processors in the multiprocessor system increases beyond two, the percentage of frames subjected to an interprocessor copy increases.

Accordingly, there is a need for a method to deliver a frame directly to the actual destination processor in a system of cooperating multiple processors.

Another goal is a multi-processor computer system which is scalable (particularly up) wherein the distribution of work is easily distributed across such scaling.

These and other objects and goals of the invention will be readily apparent to one of ordinary skill in the art on the reading of the background above and the description below.

SUMMARY OF THE INVENTION

According to one aspect of the invention, network packets are routed at a network adapter to appropriate destinations utilizing a configurable filter tree.

According to another aspect of the invention, the filter tree includes nodes for testing specified packet header fields and routing the packets according to values encoded by the packet header fields.

According to another aspect of the invention, an if-node has one input path and first and second if-node output paths.

An if-type packet header is tested and the packet is routed along either the first or second path depending on the value encoded by the if-type field.

According to another aspect of the invention, a case-node has one input path and more than two case-node output paths. A case-type packet header is tested and the packet is routed along one of the case-node output paths depending on the value of the case-type packet header.

According to another aspect of the invention, a leaf-node routes incoming packets to a designated destination.

According to a further aspect of the invention, the case-node can be selected to test packets for source and destination network addresses and ports and route packets having selected source and destination network addresses and ports to a selected destination port thereby establishing a virtual circuit.

Other features and advantages of the invention will be apparent in view of following detailed description and appended drawings.

DESCRIPTION OF THE PREFERRED EMBODIMENT

Scenario

FIG. 1 is an illustration of a typical communications internetwork 100 of the prior art. In FIG. 1, processors 110a, 110b, ..., 110n interconnect by means of network 120. I/O controllers 130a, 130b, ..., 130n also connect to network 120.

Within their respective processors 110, I/O processes are the initial consumers of the data transported over the network 120.

Processors 111a, 111b, ..., 111n and the network 120 connect to the internetwork 122 by means of the gateways 131 and 130, respectively.

In the multiprocessors systems embodying the invention, the processors 110 cooperate to distribute the workload among themselves. The I/O processes are ordered such that one such process is designated the primary I/O process. Each of the controllers (adapters) 130 employs a frame filter tree to filter communications frames from the network 120 and route those frames directly to the I/O process on the actual destination processor 110 which is the initial consumer of the data in the frames.

A frame filter is a test which, typically, a LAN controller performs on a host-bound frame from the LAN. A filter tree is a hierarchy of such tests forming a decision-making tree. The leaves of the filter tree represent destinations for specific LAN frames.

Data Structures

The data structures and protocols used in a preferred embodiment to achieve the filtering and routing of the invention are described below.

First, in order to enable a I/O controller or other gateway to filter frames, a user must be able to construct a frame filter in the I/O controller.

The two main data structures implementing frame filters are nodes and trees of nodes. These are discussed in turn below. (Exact data structure definitions are given in Appendix A below.)

Nodes are the building blocks of a filter tree. In a preferred embodiment, there are four classes of nodes: root, leaf, if or case. One data structure represents all of the classes of nodes, and this structure includes a portion that is common and another portion that is specific to these classes.

Figure 4:
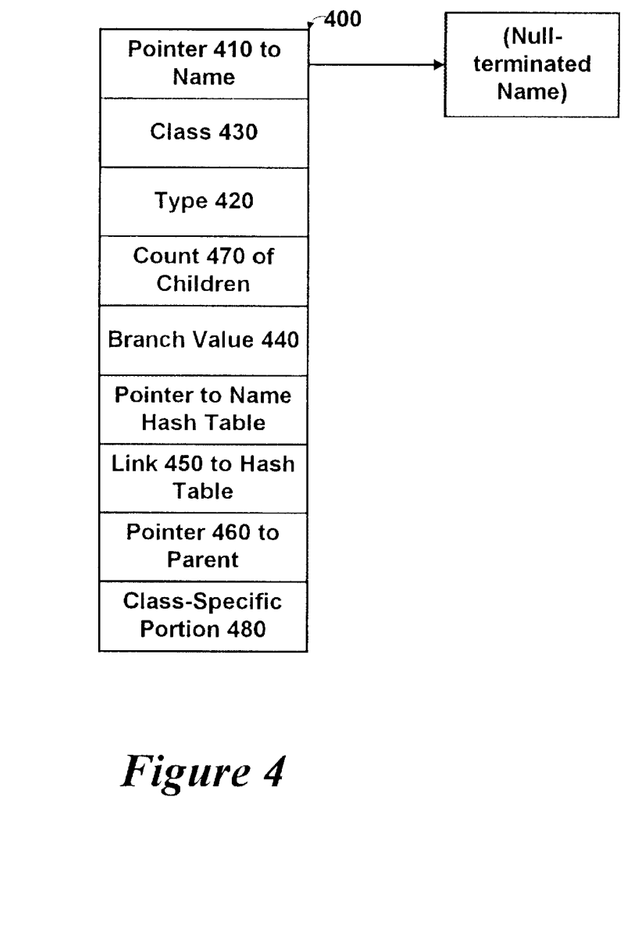
FIG. 4 is a schematic diagram of a generic filter node.

FIG. 4 illustrates a filter node 400. As FIG. 4 shows, in its common portion, each node 400 has a (pointer to 2) name 410, a class 430, a type (or sub-class) 420, a branch value 440, a hash link 450, a pointer 460 to its parent node and a count 470 of its immediate children.

A name is a NULL-terminated string of characters that uniquely identifies its filter node.

The classes and sub-classes of filters are static. A user cannot define his own filter tests. In a preferred embodiment, the sub-classes of filter nodes are as given in

TABLE I

| Filter Class | Filter Sub-Class |
| --- | --- |
| IF | DIX |
|  | IPX |
|  | TCP |
|  | UDP |
| CASE | DIX |
|  | LLC |
|  | SNAP |
|  | SOURCE_IP_ADDRESS |
|  | DESTINATION_IP_ADDRESS |
|  | TCP_PORT_PAIR |
|  | UDP_PORT_PAIR |
|  | IPX |
|  | SPX |
|  | XDR |
| LEAF | DESTINATION |

Each sub-class given in Table I is described below.

Figure 5:
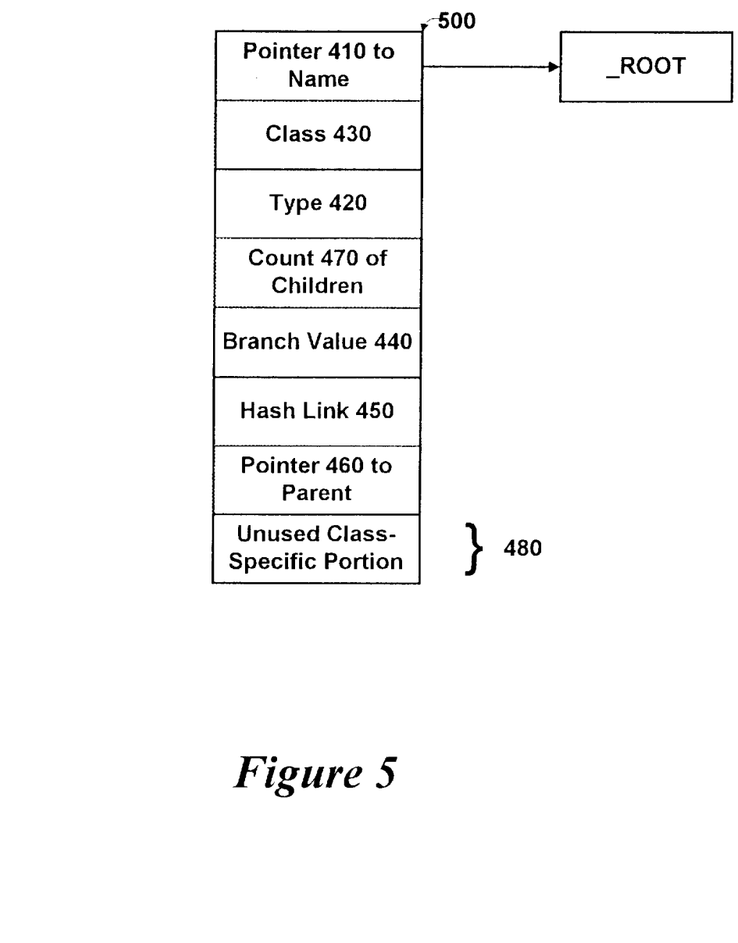
FIG. 5 is a schematic diagram of a root node.

FIG. 5 illustrates a root node 500. Each filter tree has exactly one root node 500. A root node 500 is a named entity upon which a user can attach a filter tree.

In a preferred embodiment, the procedure which initializes the filter tree creates its root node 500. The name 410 of the root node 500 is standardized, e.g., "_ROOT." Finally, while a root node 500 has the class-specific portion mentioned above, this class-specific portion is not used.

Figure 6:
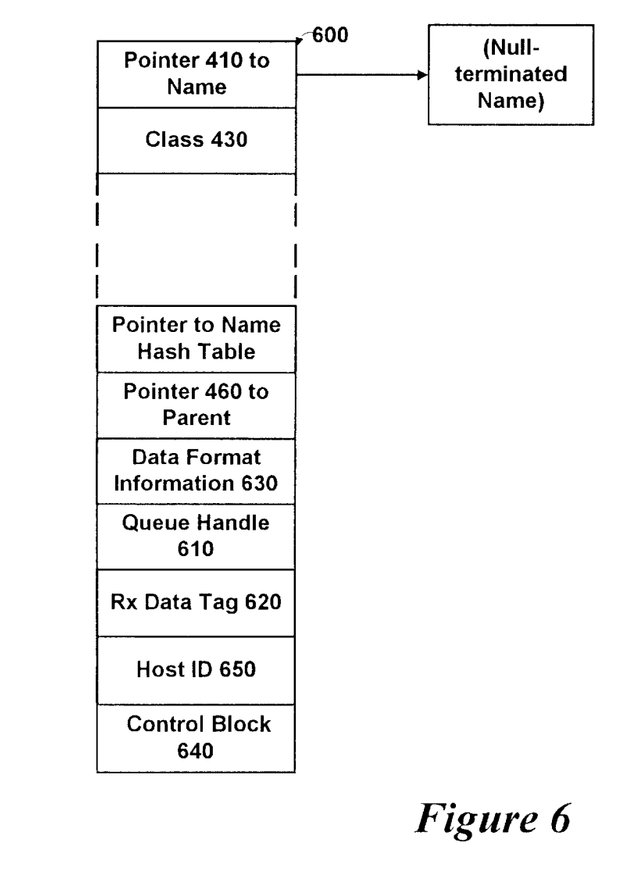
FIG. 6 is a schematic diagram of a leaf node.

FIG. 6 illustrates a leaf node 600. Always childless, a leaf node 600 represents a destination for a frame. Accordingly, in their class-specific portion, leaf nodes 600 have a queue handle 610, a receive data tag 620, data formatting information 630, and a user-defined structure 640. The user initializes and manages the user-defined structure 640, which may contain anything the user wishes to associate with the leaf.

Figure 7:
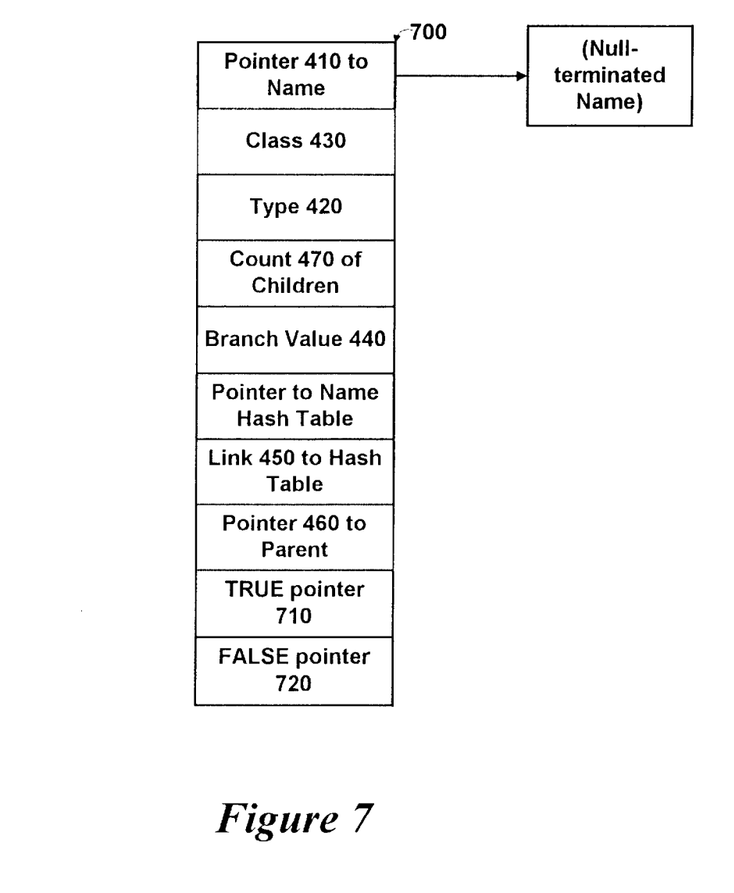
FIG. 7 is an a schematic diagram of if node.

FIG. 7 illustrates an if node 700. An if node 700 represents a Boolean decision. The sub-class 420 of an if node 700 specifies the boolean test that the node 700 represents, and the TRUE and FALSE pointers 710, 711 in the class-specific portion indicate the children of the if node 700.

Figure 8:
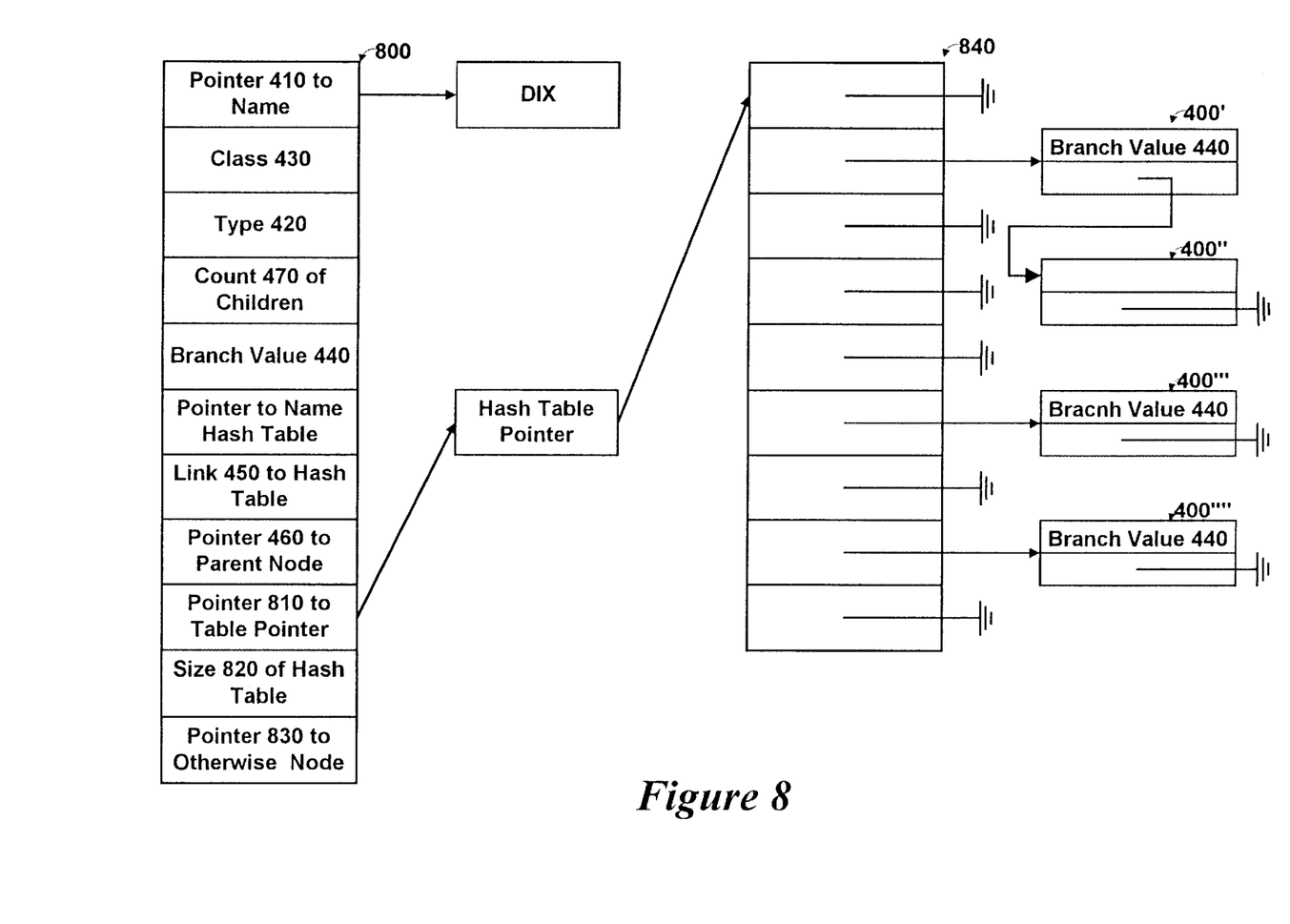
FIG. 8 is a schematic diagram of a case node.

Case nodes represent fan-out decisions, much like the case statements of common block-structured languages (e.g., C). FIG. 8 illustrates a case node 800. The type 420 of the case node specifies the test to be performed on the frame and thus the value in the frame to be used as the case selector. This value from the frame is compared against the branch value 440 of the children of the case node. When a match occurs, that child branch node is chosen.

In a preferred embodiment, a variable-size open-table hash 840 implements a case node. The user specifies the hash table size 820 when the case node is added to the filter tree. For optimum performance, the table 840 is larger than the number of entries (children), although any number of entries may be added.

More particularly, FIG. 8 illustrates a _(DIX) case node which has four children: 400', 400'', 400''', 400''''. In this example, each of the children 400 has a branch value 440 which is used as the hash key. This value 440 represents the DIX protocol field. (The type/protocol field of an Ethernet MAC header.) This value modula the size 820 of the hash table 840 is the index into the hash table 840. From the selected hash table entry depends a standard linked list of children.

A filter tree 1000 (see FIG. 10) consists of three main parts: a pointer 1010 to a name hash table 1040, a root node 500, and a user control block 1030.

The name table 1040 is an open-table hash of the names 410 of all of the filter nodes 400 in the filter tree 1000. This table allows nodes to be referenced by name without a significant performance penalty. Nodes are typically linked on both the name hash table and on the decision-making tree through the root node 500.

The root node 500 is like any other node 400 in most respects. Its name exists in the name hash table 1040, and it can be manipulated according to most of the standard protocol functions described below. One difference is that the root node 500 cannot be deleted. Its only child is the start of the filter tree (usually "_IFENET").

The user control block 1030 is a user-defined data structure. The user initializes and manages this structure, which may contain anything the user wishes to associates with a filter tree 1000. The protocols explained below pass the user control block 1030 to the GET and PUT memory calls so that the user may use the block 1030 for memory allocation information.

Several of the sub-classes given in Table I are described below.

A DIX-sub-class if node filter tests the Ethernet Media Access Control (MAC) length/type field to determine whether it is larger than 1500. The MAC length/type field is a two-byte field located twelve bytes from the beginning of an Ethernet frame.

An IPX-sub-class if node tests the two bytes following an Ethernet MAC header to determine whether they are equal to %hfff. These two bytes are located fourteen bytes from the beginning of an Ethernet frame.

A TCP-sub-class if node tests a frame to determine whether its IP protocol field is equal to 6. This two-byte field is located twenty-four bytes from the beginning of an Ethernet frame (with IP over DIX Ethernet).

A UDP-sub-class if node test a frame to determine whether its IP protocol field is equal to 17.

A DIX-sub-class case filter fans out on the Ethernet MAC length/type field.

An LLC-sub-class case filter fans out on the LLC (IEEE 802.2) DSAP field. This is a one-byte field located fifteen bytes from the beginning of an Ethernet frame.

A SNAP-sub-class case filter fans out on the SNAP Protocol ID field. This is a five-byte field located seventeen bytes from the beginning of an Ethernet frame. This filter is typically used on an LLC UI frame that has a DSAP and a SSAP of %haa.

A SOURCE_IP_ADDRESS-sub-class case filter fans out on the IP source IP address field. This four-byte field is located twenty-six bytes from the beginning of an Ethernet frame (with IP over DIX Ethernet).

A DESTINATION_IP_ADDRESS-sub-class case filter fans out on the IP destination IP address field. This four-byte field is located thirty bytes from the beginning of an Ethernet frame (with IP over DIX Ethernet).

A TCP_PORT_PAIR-sub-class case filter fans out using the IP source and destination addresses and the TCP source and destination ports. The source and destination IP addresses are consecutive four-byte fields, located twenty-six bytes from the beginning of an (IP over DIX Ethernet) Ethernet frame. The TCP source and destination ports are consecutive two-byte fields whose location in the frame depends on the variably sized IP header.

A UDP_PORT_PAIR-sub-class case filter fans out using the IP source and destination addresses and the UDP source and destination ports. The source and destination IP addresses are consecutive four-byte fields, located twenty-six bytes from the beginning of an (IP over DIX Ethernet) Ethernet frame. Like the TCP source and destination ports, the UDP source and destination ports are consecutive two-byte fields whose location in the frame depends on the variably sized IP header.

A SOURCE_IPX_NETWORK_NODE-sub-class case filter fans out using the IPX source network and source node. The source network and source node are respectively four- and six-byte fields consecutively located thirty-two bytes from the beginning of an (IPX over DIX) Ethernet frame.

A DESTINATION_IPX_NETWORK_NODE-sub-class case filter fans out on the IPX destination network and destination node. The destination network and destination node are respectively four- and six-byte fields consecutively located twenty bytes from the beginning of an (IPX over DIX) Ethernet frame.

A DESTINATION_SOCKET-sub-class case filter fans out on the IPX destination socket. The destination socket is a two-byte field located thirty bytes from the beginning of an (IPX over DIX) Ethernet frame.

A SOCKET_PAIR-sub-class case filter fans out on the IPX destination socket and source socket. The destination socket is a two-byte field thirty bytes from the beginning of an (IPX over DIX) Ethernet frame, and the source socket a two-byte field forty-two bytes from the beginning of the same frame.

Frame destination filters, i.e., leaf node filters, are endpoints. They represent a host location whither a frame is to be delivered.

Protocols

A user, typically by means of an application, accesses the library of filter functions for two reasons: to modify a filter tree or to route a frame by traversing a filter tree to the appropriate leaf. It performs these functions using a Filter Management Protocol (FMP) described herein.

(In describing the functions below, for ease of description, a data structure may be described as the argument or input to a function when in fact a pointer, a double pointer, or even a severally indirect pointer to that data structure is the actual argument or input. A person of ordinary skill in the art will appreciate when to make the appropriate substitution.)

A first function, INITIALIZE_TREE( ), takes as an argument a previously allocated filter tree and initializes the tree. This function initializes the root node, allocates memory for the name hash table and enters the root node in the name hash table.

ADD_FILTER( ) adds a child node to a filter tree and returns a pointer to that child node. The ADD_FILTER( ) function receives as inputs a filter tree, the name 410 of the parent of the filter node to be added, and the name, class and type 410, 430, 420 of the child node. The function allocates memory for the child node and initializes the common section. ADD_FILTER( ) initializes the type-specific portion 480 depending on the type 420 of the child node. The ADD_FILTER( ) function therefore has an additional argument specifying whether the node to be added depends from the TRUE branch 710 or FALSE branch 720 of a parent if node 700.

The function ADD_DEFAULT_TREE( ) accepts as input a previously allocated filter tree and adds a default tree to that tree. The default tree may be constructed, for example, to insure backward compatibility. The function ADD_FILTER( ) described above partially implements ADD_DEFAULT_TREE( ).

DELETE_FILTER( ) accepts a filter tree and the name of a node and deletes the named filter from the filter tree. DELETE_FILTER looks up the filter node in the name hash table and passes the found pointer to the DELETE_FILTER_BY POINTER( ) function. DELETE_FILTER_BY_POINTER( ) accepts a pointer to a filter node and checks the type 420 of its parent node. If the parent node is the root of the tree, the function de-links the node from the root node and frees the memory allocated to the delinked node. Where the parent node is a case node 800, the function deletes the node from the hash table of the parent, using the branch value 440 of the named filter as the hash key. Finally, where the parent node is an if node, the function delinks the node from the parent's TRUE or FALSE branch. (Of course, the parent node cannot be a leaf.)

A DELETE_BRANCH( ) function deletes a specified node and all of its children, if any. DELETE_BRANCH( ) traverses the subtree identified by the node in post order and deletes each node it encounters.

APPLY_DELETE_LEAF_BY_HOSTID( ) accepts a node and a hostid as input. Where the hostid 650 of the node matches the input hostid, APPLY_DELETE_LEAF_BY_HOSTID( ) calls DELETE_FILTER( ) to remove the node.

The DELETE_LEAF_BY_HOSTID( ) function deletes all the leaves of a specified filter tree whose hostid 650 matches a specified hostid. DELETE_LEAF_BY_HOSTID( ) calls POST_APPLY( ) with APPLY_DELETE_LEAF_BY_HOSTID( ) as the user-defined function.

An APPLY_POST( ) function receives a subtree and a user-defined function as inputs and performs a post order traversal of the input subtree, executing the function to visit the node. All such user-defined functions return the same error indicator, say, a non-zero integer. Should the user-defined function return an error, APPLY_POST( )'s traversal of the subtree ceases.

APPLY_TO_LEAF( ) receives as input a node and a user-defined function, applying the function to the node if the node is in fact a leaf. Where the node is not a leaf, APPLY_TO_LEAF( ) returns, preferably indicating an error.

APPLY_TO_LEAVES receives a filter tree and a user-defined function as inputs and applies the function to each leaf in a tree. Effectively, APPLY_TO_LEAVES( ) calls APPLY_POST( ), specifying APPLY_TO_LEAF( ) as the user-defined function.

A function, FIND_MATCHING_LEAF( ), receives as input a filter tree and a frame. FIND_MATCHING_LEAF( ) walks the specified filter tree to return a leaf filter, if any, matching the frame. The function sets a filter node pointer to the node at the root of the tree (pointed to by the root node 500. When FIND_MATCHING_LEAF( ) encounters a case node 800, it searches the hash table using the information from the specified frame and sets the filter node pointer to the results of the search. When FIND_MATCHING_LEAF( ) encounters an if node 700, it performs the indicated boolean test on the frame and sets the filter node pointer to the TRUE or FALSE link 710, 720 of the if node, depending on the results of the test 600. When the function arrives at a leaf 600, it returns that leaf node. Of course, if FIND_MATCHING_LEAF( ) encounters a root node, it reports an error.

INSERT_ENDPOINT_PAIR( ) inserts a specified filter node into a specified hash table. INSERT_ENDPOINT_PAIR uses as the hash key an endpoint pair consisting of source and destination IP addresses and source and destination port numbers. In a preferred embodiment, INSERT_ENDPOINT_PAIR sums the four numbers (two IP addresses, two port numbers) and modulos that sum to the size of the specified hash table to create the hash key. The specified filter node is inserted into the hash table at that index.

Correspondingly, FIND_ENDPOINT_PAIR( ) finds a filter node with a specified endpoint pair in a specified filter tree. In a preferred embodiment, FIND_ENDPOINT_PAIR( ) generates a sum-modulo index into the hash table using the four elements of the endpoint pair to create a key into the hash table. The function then walks down the linked list of nodes indexed at that point, searching for a node whose branch 440 equals the specified endpoint pair. If found, the first such matching node is returned.

Finally, REMOVE_ENDPOINT_PAIR( ) removes a filter with a specified endpoint pair from a specified hash table. In a preferred embodiment, REMOVE_ENDPOINT_PAIR( ) generates a sum-modulo index as FIND_ENDPOINT_PAIR( ) does and then walks down the index linked list of nodes to find the node with an endpoint pair matching the specified endpoint pair. This node, if found, is delinked from the filter tree and from the hash tale. Its memory space is reclaimed.

A group of functions manipulates a filter node in a hash table according to a key. The function INSERT_FILTER_BY_KEY( ) inserts a specified node into a specified hash table, using a specified (preferably 32-bit) hash key. INSERT_FILTER_BY_KEY( ) generates an index into the hash table by subjecting the hash key to a modulo operation. The node is then inserted into the hash table at the generated index. A companion function, FIND_FILTER_BY_KEY( ), uses a specified search value as a key into a specified hash table to find the filter in the hash table matching the search value. In a preferred embodiment, FIND_FILTER_BY_KEY( ) generates an index into the hash table from a modulo of the search value to the table size. FIND_FILTER_BY_KEY( ) then walks down the indexed linked list to find the node whose branch 440 is equal to the specified search value. This node, if found, is returned. Finally, REMOVE_FILTER_BY_KEY( ) removes a node from a specified hash table, using a hash key.

Another group of functions manipulates a filter node in a hash table according to the name 410 of the node. The function INSERT_FILTER_BY_NAME( ) inserts a specified node into a specified hash table, using the name of the node as the hash key. In a preferred embodiment, INSERT_FILTER_BY_NAME( ) uses CONVERT_NAME_TO_INDEX( ) to generate an index into the hash table by converting the filter name into an integer value which it then subjects to a modulo operation. The node is inserted into the hash table at the thusly generated index. A companion function, FIND_FILTER_BY_NAME( ), uses a specified name as a key into a specified hash table to find the filter in the hash table with the specified name. FIND_FILTER_BY_NAME( ) generates an index into the hash table from the filter name in the same way as INSERT_FILTER_BY_NAME( ). FIND_FILTER_BY_NAME( ) then walks down the indexed linked list to find the node whose name 410 is the same as the specified name. This node, if found, is returned. Finally, REMOVE_FILTER_BY_NAME( ) removes a node from a specified hash table, using a specified name key.

A third group of functions manipulates an IEEE 802.1 Subnetwork Access Protocol (SNAP) filter node in a hash table according to the header of the SNAP frame to which the filter node applies. The function INSERT_SNAP_FILTER( ) inserts a specified filter node into a specified hash table, using the header of the SNAP frame to which the filter node applies. In a preferred embodiment, INSERT_SNAP_FILTER( ) generates an index into the hash table by converting the manufacturer and protocol identification fields of the applicable SNAP frame into an integer value which is then subjected to a modulo operation. The node is inserted into the hash table at the thusly generated index. A companion function, FIND_SNAP_FILTER( ), uses specified manufacturer and protocol identification fields as a key into a specified hash table to find the filter in the hash table matching the header identification fields. FIND_SNAP_FILTER( ) generates an index into the hash table from specified manufacturer and protocol identification fields in the same manner as INSERT_SNAP_FILTER( ). FIND_SNAP_FILTER( ) then walks down the indexed linked list to find the node whose branch 440 is equal to the specified search value. This node, if found, is returned. Finally, REMOVE_SNAP_FILTER( ) removes a node from a specified hash table, using specified manufacturer and protocol identification fields.

GET_LEAF_INFO( ) returns a copy of a named leaf node, thereby returning the information associated with that leaf node.

GET_GMAC_LIST( ) returns a list of all of the group MAC addresses currently in use in a specified tree. GET_GMAC_LIST_COUNT( ) returns the count of the group MAC addresses currently in use, respectively.

The GET_NEXT_FILTER( ) function returns each node in a hash table, one node per call. A routineer in the art will readily understand that state must be saved between calls to GET_NEXT_FILTER and that some mechanism must be provided for initializing the state with respect to a specific hash table.

ADD_SNAP_FILTER( ) adds the SNAP case node.

DELETE_TREE( ) deallocates the memory for the name hash table, deleting nodes in the tree as necessary.

Generally, on encountering an if node 700, I/O controller software chooses the node indicated by the TRUE or FALSE pointer 710, 720, depending on the result of the test dictated by the sub-class 420 of the node 700.

On encountering a case node 800, the software creates a key determined by the sub-class 420 of the node 800 and invokes a FIND_FILTER_BY_ function to choose among the children of the node. For example, an LLC-sub-class case filter uses the DSAP as the fan-out value. As the DSAP covers eight bits, the case node could have one child for each of the two hundred fifty-six possible DSAP values. Should none of the branch values 440 of the children match the branch value 440 specified in the case node 800, the software will select the "otherwise" node.

On encountering a frame destination filter (i.e., a leaf filter node 600), the software routes the frame of interest to the destination which the leaf node specifies.

On encountering a black hole, the software will discard the instant frame. Not actually a filter, a black hole is a graphical representation of what happens to a frame when the software encounters a NULL (e.g., zero) pointer rather than a route to a leaf filter.

If the protocols described above operate in an unprotected environment, certain unenforced rules should be obeyed to maintain the consistency of the paradigm. These rules follow logically from the description above and include: (1) The tree should be an acyclic directed graph (i.e., no loops). (2) Filters should be placed in locations where their protocols are guaranteed to be present in the frame. For example, if the frame is not an IP frame, then a TCP if filter should not be used.

Concurrency Approach

A combination of semaphores and mutex should be used to avoid concurrency problems. The filter library uses mutex on critical regions of the add and delete functions but in other areas, the exclusive-access method used is system-dependent and must be provided by the caller. For example, on a NSK system a semaphore might be appropriate whereas another implementation would use mutex where its operating system has no semaphore mechanism. Therefore, concurrency protection is largely the responsibility of the calling function.

The filter library is designed to provide write/read access from a non-interrupt environment and read-only access from an interrupt environment.

On the host computer side, in an interrupt environment, FIND_LEAF( ) can be called safely (e.g., by remote procedure call (RPC) or other interprocessor protocol). Most other functions are not called since they are not resident. A general guideline is that any function can be called if it is resident, only calls the resident functions and does not modify the filter tree.

In a non-interrupt environment, exclusive access (except for a LAN receive interrupt) to the filter tree is ensured. This can be accomplished by placing a semaphore in the user control block portion of the filter tree data structure. The semaphore is acquired before calling any filter functions.

On the LAN adapter side, FIND_LEAF( ) can be safely called in an interrupt environment, provided there are no higher priority interrupts that can occur which will modify the filter tree. If this cannot be guaranteed, the entire call is mutexed.

In a non-interrupt or configuration environment, exclusive access (except for a LAN receive interrupt) to the filter tree is ensured with mutex or by an embedded operating system which is non-preemptive.

Scenario Revisited

Figure 2:
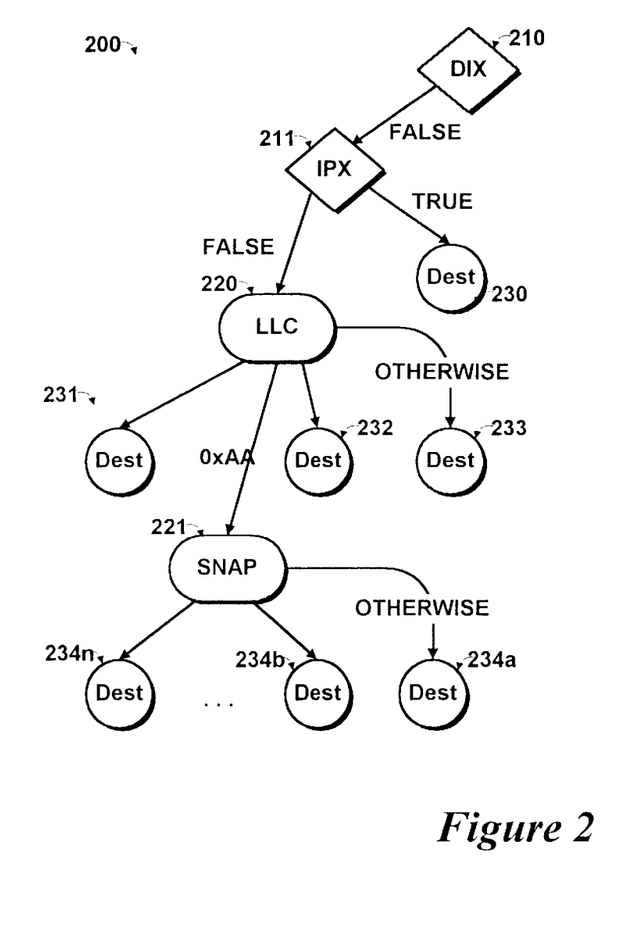
FIG. 2 is a graph depicting default filter tree.

The following example is related in terms of Ethernet and the Internet and Transmission Control Protocols (IP and TCP). Widely know in the art, the IP and TCP standards are available, for example, at http://www.pmg.les.mit.edu/rfc.html as Requests for Comment (RFC's) 791 and 793. A person of ordinary skill in the art will readily appreciate the application of the invention to other protocols. When a LAN device 130 is first activated, it constructs a default tree such as filter tree 200 of FIG. 2. In FIG. 200, if nodes 700, case nodes 800 and leaf nodes 600 are represented by diamonds, oblongs and circles, respectively. A NULL pointer to a filter node is represented with the NULL symbol. QIO clients ad, link and delete filters as needed. These processes are described in detail in U.S. patent application Ser. No. 09/136,008, entitled, "Method and Apparatus for Portraying a Cluster of Computer Systems as Having a Single Internet Protocol Image," naming Leonard R. Fishler et al. as inventors and filed on Aug. 17, 1998. U.S. patent application Ser. No. 09/136,008 is incorporated herein by reference.

In the TCP/IP example discussed above, the establishment of a connection causes a corresponding filter to be added to the filter tree. The resulting filter routes all data to the connection to the proper processor. Termination of the connection causes the deletion of the filter.

(UDP is a datagram service. No connections are established. Routing the data in an intelligent fashion may not always be possible. For UDP, frames may be routed by well-known port number.)

Figure 3:
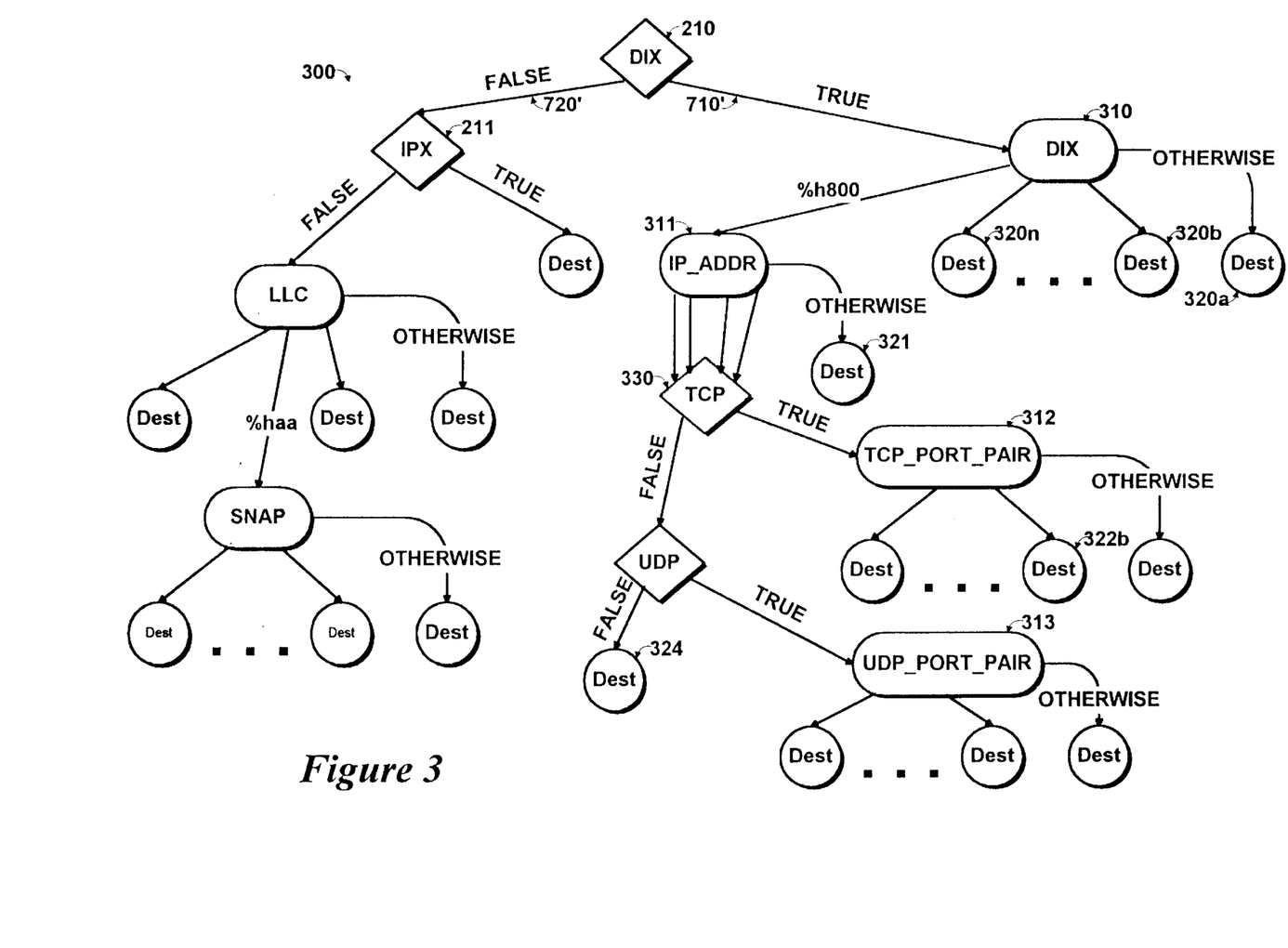
FIG. 3 is a graph depicting a filter tree.

Assume that the system 100 has established connections as necessary to produce the filter tree 300 of FIG. 3. On receipt of the frame 900 of FIG. 9, the LAN software will walk the filter tree 300 as follows: Beginning with the root 210 of the filter tree, the software determines the class 430 and sub-class 420 of the filter node 210. Recognizing it as an if node 700 of the DIX sub-class, the software tests the frame 900 to determine whether the Ethernet MAC length/type field (two bytes located fourteen bytes from the beginning of the Ethernet frame) is larger than 1500, as the DIX if node 210 directs. In this example, the field is, and the software selects the filter node 310 indicated by the TRUE pointer 710 of the if node 210. (Of course, when the software determines that the frame 900 does not satisfy the test which the if node 700 indicates, the software selects the filter node indicated by the FALSE pointer 720 of the if node 700, here, 211.)

Again, the LAN software determines the class 430 and sub-class 420 of the instant filter node, node 310. Recognizing it as a case node 800 of the DIX sub-class, the software fans out on the Ethernet MAC length/type field. Using FIND_FILTER_BY_KEY( ) with the value of the length/type field as the key, the software selects the node 311. The value of the field is %h800.

(Had FIND_FILTER_BY_KEY( ) indicated that no node filter matched the given key, the software would have selected the filter node 320*a* as the next node filter. Because node 320*a* is a leaf node 600, the frame would have been routed to the destination represented by the leaf filter node 320*a*.)

Figure 9:
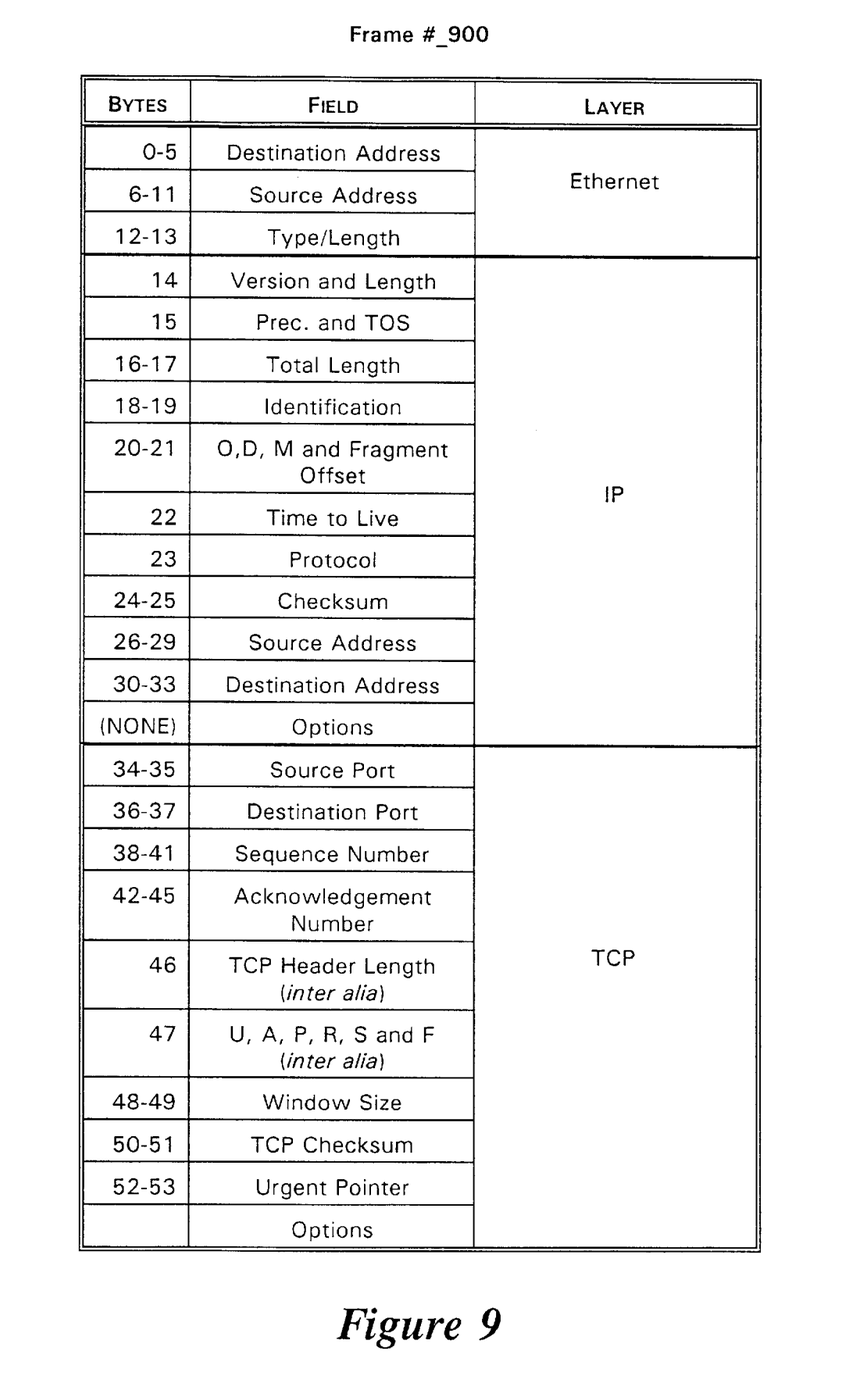
FIG. 9 is a schematic diagram of a frame.

The software determines the class 430 and sub-class 420 of the filter node 311 as another case node 800, but with the sub-class IP_ADDR. This time, the software fans out on the IP address of the frame 900, differentiating between recognized and unrecognized IP addresses. Unrecognized IP addresses cause the software to select the "otherwise" filter node 321. Given the IP address of the frame 900, FIND_FILTER_BY_KEY( ) recognizes certain IP addresses (here, all for TCP) and returns the filter node 330 accordingly.

The LAN software determines the class 430 and sub-class of the filter node 330 as an if node 700 of the TCP sub-class. Therefore, the software tests the frame to determine whether the IP protocol field (the two bytes located twenty-four bytes from the beginning of the Ethernet frame) is equal to 6 (i.e., indicates the TCP protocol). If the frame's IP protocol field is neither TCP nor UDP, the LAN forwards the frame to the destination corresponding to the leaf node 324.

Having determined the frame's IP protocol to be TCP, the software decodes node 312 as a case node 800 of the TCP_PORT_PAIR sub-class. Accordingly, the LAN fans out on four different fields of the frame 900: the IP source and destination addresses and the TCP source and destination ports. The former are consecutive four-byte fields located twenty-six bytes from the beginning of an Ethernet frame. The latter are consecutive two-byte fields whose location in an Ethernet frame depends on the variably sized IP header. The software passes a key composed of these four fields to FIND_FILTER_BY_KEY( ) which returns the appropriate filter node 322b.

UDP frames are similarly handled by the case filter node 313.

Of course, the program text for such software as is herein disclosed can exist in its static form on a magnetic, optical or other disk, on magnetic tape or other medium requiring media movement for storage and/or retrieval, in ROM, in RAM, or in another data storage medium. That data storage medium may be integral to or insertable into a computer system.

The examples, illustrations and the like related in the above description are meant as explanatory aids only. Certain variations on the above teachings will be apparent from the teachings themselves. Accordingly, the invention according to this patent is defined by the metes and bounds of the claims below.

What is claimed is:

1. A method for routing network packets to a destination, where each packet includes header fields encoding information about the packet, and with the method performed on a network adapter coupling a node, including a plurality of destinations, to the network, said method comprising the steps of:

forming a filter tree including a root-node naming the filter tree and located at a beginning of the filter tree, an if-node having one input path and if-node two output paths for testing a designated if-type packet field encoding two possible values, a case-node having one input path and more than two case-node output paths for testing a designated case-type packet filed encoding more than two possible values, and a leaf-node having one input path and indicating a designated output destination;

receiving a network packet including said designated if-type packet field, and said designated case-type packet field;

filtering said if-type packet field at said if-node and routing the packet along the first or second if-node output path depending on the possible value encoded by the if-type field;

filtering said case-type packet field and routing the packet along one of a plurality of case-node output paths depending on the possible value encoded by the case-type packet field; and subsequent to said filtering, receiving said network packet at said leaf-node; and routing the packet to said output destination when the packet is received at the leaf-node so that packets having designated fields encoding particular values are routed to the designated output destination.

2. The method of claim 1 where said step of forming comprises:

selecting said case-node to test a designated case-type packet field being a destination-address type field so that said case-node fans out packets to leaf-nodes having designated outputs with destination addresses indicated by said destination address type field.

3. The method of claim 1 wherein said step of forming comprises:

selecting said case-node to test a designated case-type packet field being a port-pair type field indicating source network address and port number and destination network address and port number so that said case-node fans out packets having source network address and port numbers indicated by said case-type packet field to a leaf-node having designated outputs with destination network addresses and port numbers indicated by said destination-address type field.

4. A system for routing network packets to a destination, where each packet includes header fields encoding information about the packet, and with the method performed on a network adapter coupling a node, including a plurality of destinations, to the network, said system comprising:

a plurality of nodes;

a network adapter coupling a first node to said network, with said network adapter for receiving a network packet including said designated if-type packet field, and said designated case-type packet field, with said network adapter including a filter tree including a root-node naming the filter tree and located at a beginning of the filter tree, an if-node having one input path and first and second if-node output paths for testing a designated if-type packet field encoding two possible values, a case-node having one input path and more than two case-node output paths for testing a designated case-type packet filed encoding more than two possible values, and a leaf-node having one input path and indicating a designated output destination;

with said if-node for filtering said if-type packet field at said if-node and routing the packet along the first or second output path depending on the possible value encoded by the if-type field;

with said case-node filtering said case-type packet field and routing the packet along one of a plurality of case-node output paths depending on the possible value encoded by the case-type packet field; and with said leaf-node routing the packet to said output destination when the packet is received at the leaf-node so that packets having designated fields encoding particular values are routed to the designated output destination.

\* \* \* \* \*

UNITED STATES PATENT AND TRADEMARK OFFICE
CERTIFICATE OF CORRECTION

PATENT NO. : 6,359,886 B1
APPLICATION NO. : 09/135027
DATED : March 19, 2002
INVENTOR(S) : Dean A. Ujihara et al.

It is certified that error appears in the above-identified patent and that said Letters Patent is hereby corrected as shown below:

Column 2, line 29 reads: "FIG. 7 is an a schematic diagram of if node.";
it should read: --FIG. 7 is a schematic diagram of an if node.--;

Column 3, line 18 reads: "the sub-classes of filter nodes are as given in";
it should read: --the sub-classes of filter nodes are as given in Table I--;

Column 4:
line 14, reads: "A filter tree 1000 (see Fig. 10) consists of three main";
it should read: --A filter tree consists of three main--;

line 15, reads: "parts: a pointer 1010 to a name hash table 1040, a root node"
it should read: --parts: a pointer to a name hash table 1040, a root node--;

line 16, reads: "500, and a user control block 1030."
it should read: --500, and a user control block.--;

line 17, reads "The name table 1040 is an open-table hash of the names"
in should read: --The name table is an open-table hash of the names--;

line 18, reads "410 of all of the filter nodes 400 in the filter tree 1000. This";
it should read: --410 of all of the filter nodes 400 in the filter tree. This--;

line 24, reads: "respects. Its name exists in the name hash table 1040, and it"
it should read: --respects. Its name exists in the name hash table, and it--;

line 29, reads: "The user control block 1030 is a user-defined data struc-";
it should read: --The user control block is a user-defined data struc---;

line 31, reads: "may contain anything the user wishes to associates with a";
it should read: --may contain anything the user wishes to associate with a--;

line 32, reads: "filter tree 1000. The protocols explained below pass the user";
it should read: --filter tree. The protocols explained below pass the user--;

line 33, reads: "control block 1030 to the GET and PUT memory calls so";
it should read: --control block to the GET and PUT memory calls so--;

line 34, reads: "that the user may use the block 1030 for memory allocation";
it should read: --that the user may use the block for memory allocation--;

UNITED STATES PATENT AND TRADEMARK OFFICE
CERTIFICATE OF CORRECTION

PATENT NO. : 6,359,886 B1
APPLICATION NO. : 09/135027
DATED : March 19, 2002
INVENTOR(S) : Dean A. Ujihara et al.

It is certified that error appears in the above-identified patent and that said Letters Patent is hereby corrected as shown below:

line 51, reads: "A UDP-sub-class if node test a frame to determine";
it should read: --A UDP-sub-class if node tests a frame to determine--;

Column 7:
line 9, reads: "PAIR uses as a hash key an endpoint pair consisting of";
it should read: --PAIR( ) uses as a hash key an endpoint pair consisting of--;

line 13, reads: "ENDPOINT_PAIR sums the four numbers (two IP";
it should read: --ENDPOINT_PAIR( ) sums the four numbers (two IP--;

line 30 reads: "ENDPOINT_PAIR( ) does and then walks down the index";
it should read: --ENDPOINT_PAIR( ) does and then walks down the indexed--;

line 33 reads: "delinked from the filter tree and from the hash tale. Its";
it should read: --delinked from the filter tree and from the hash table. Its--;

Column 8:
line 43, reads: "GET_NEXT_FILTER and that some mechanism must be";
it should read: --GET_NEXT_FILTER( ) and that some mechanism must be--;

line 55, reads: "invokes a FIND_FILTER_BY_function to choose among";
it should read: --invokes a FIND_FILTER_BY_NAME( ) function to choose among--;

Column 9:
line 60 reads: "node is represented with the NULL symbol. QIO clients ad,";
it should read: --node is represented with the NULL symbol. QIO clients add,--;

Claim 1 at Column 11:
line 27 reads: "if-node having one input path and if-node two output";
it should read: --if-node having one input path and two if-node output-- line 31 reads: "for testing a designated case-type packet filed encoding";
it should read: --for testing a designated case-type packet field encoding--

UNITED STATES PATENT AND TRADEMARK OFFICE
CERTIFICATE OF CORRECTION

PATENT NO. : 6,359,886 B1
APPLICATION NO. : 09/135027
DATED : March 19, 2002
INVENTOR(S) : Dean A. Ujihara et al.

It is certified that error appears in the above-identified patent and that said Letters Patent is hereby corrected as shown below:

Claim 4 at Column 12, line 36 reads: "nated case-type packet filed encoding more than two";
it should read: --nated case-type packet field encoding more that two--

Signed and Sealed this

Nineteenth Day of February, 2008

JON W. DUDAS
*Director of the United States Patent and Trademark Office*